United States Patent [19]
Gee et al.

[11] 3,901,535
[45] Aug. 26, 1975

[54] MODULAR DUMP TRAILER STRUCTURE

[75] Inventors: James E. Gee, Washington; Frank A. Grooss, Morton; Raymond L. Moser, Tremont, all of Ill.

[73] Assignee: Caterpillar Tractor Company, Peoria, Ill.

[22] Filed: June 11, 1974

[21] Appl. No.: 478,306

[52] U.S. Cl. ........................ 280/423 R; 296/28 M
[51] Int. Cl. .......................................... B62d 53/06
[58] Field of Search ....... 280/106 T, 423 R; 296/29, 296/30, 280 M; 180/89 R; 298/1 R; 105/239

[56] References Cited
UNITED STATES PATENTS

| | | | |
|---|---|---|---|
| 2,233,193 | 2/1941 | Armington et al. | 280/423 R X |
| 2,721,097 | 10/1955 | Rittenhouse | 298/35 R X |
| 2,729,503 | 1/1956 | Armington | 298/35 M |
| 2,760,816 | 8/1956 | Kling | 298/35 M X |
| 3,076,680 | 2/1963 | Kress | 298/35 M |

*Primary Examiner*—Leo Friaglia
*Assistant Examiner*—R. Schrecengost
*Attorney, Agent, or Firm*—Phillips, Moore, Weissenberger Lempio & Strabala

[57] ABSTRACT

A modular bottom dump trailer structure includes a pair of laterally spaced, substantially upstanding side wall modules, a rear end wall module laterally pilotable abuttingly secured to the side wall modules, a front end wall module laterally pilotably abuttingly secured to the side wall modules, and a pair of hopper floors oppositely outwardly, upwardly inclinably secured to the side wall modules and endwardly secured to the end wall modules to define a central elongated opening therebetween for egress of material carried in the trailer structure. Each wall module includes only a single thin plate member adapted to be loaded in tension with bracing members secured internally thereof. A V-shaped draft beam is pilotably secured to the side wall modules rearwardly of the front end wall module to provide strength and stability for the trailer structure.

16 Claims, 4 Drawing Figures

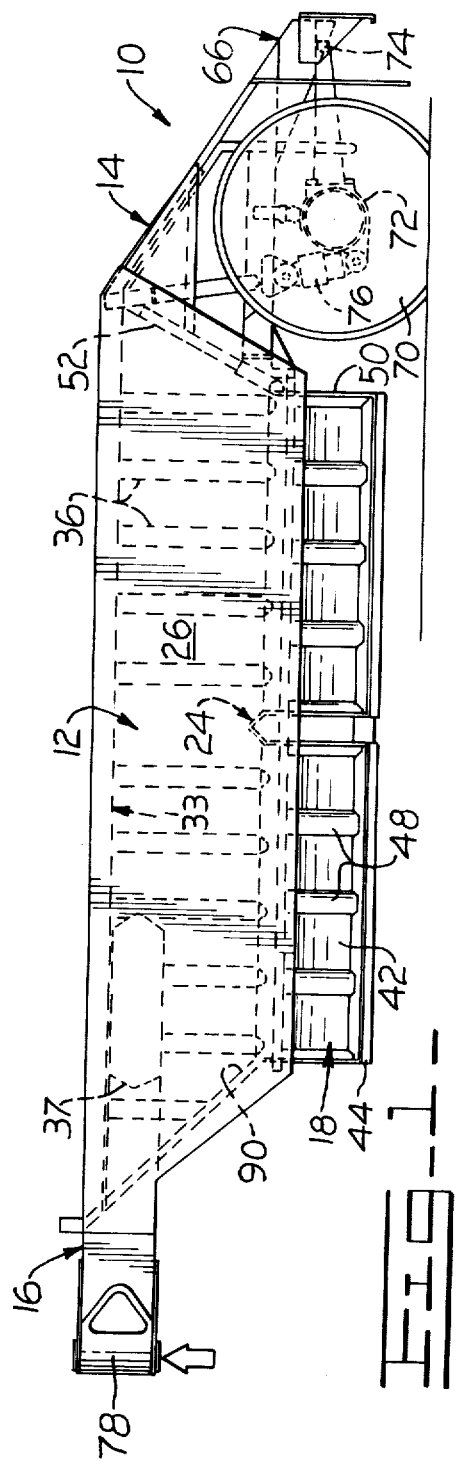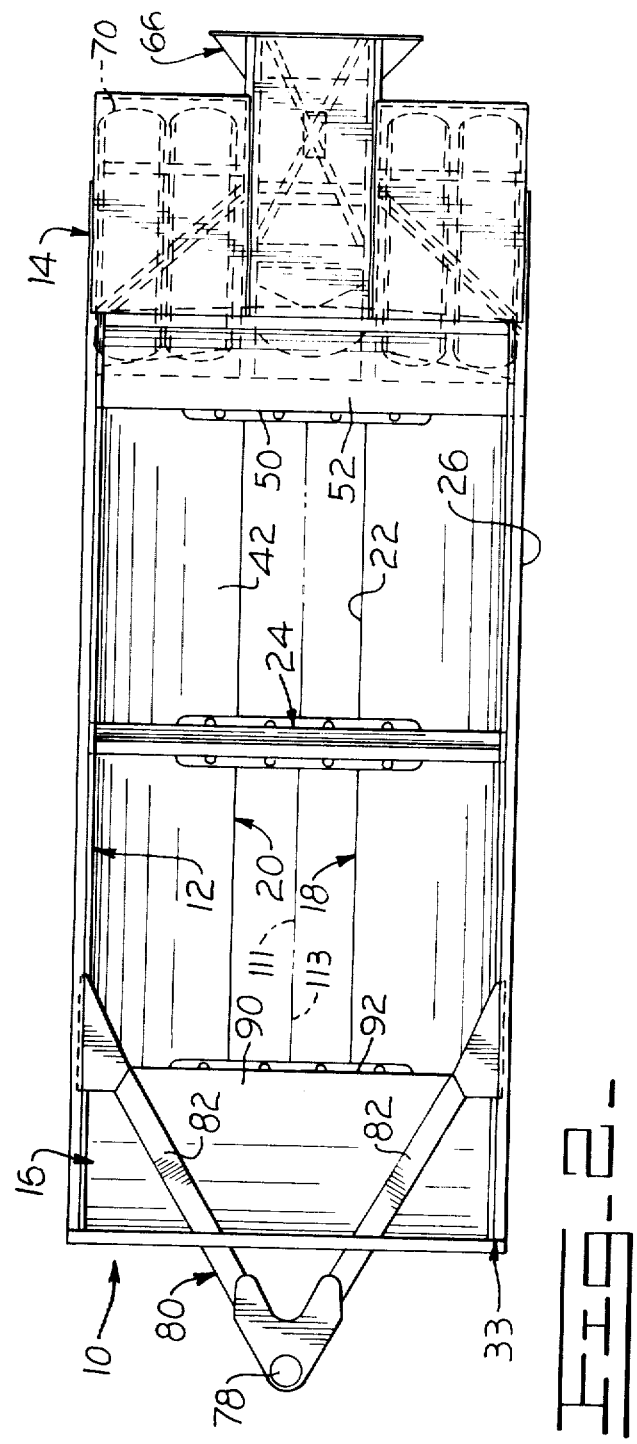

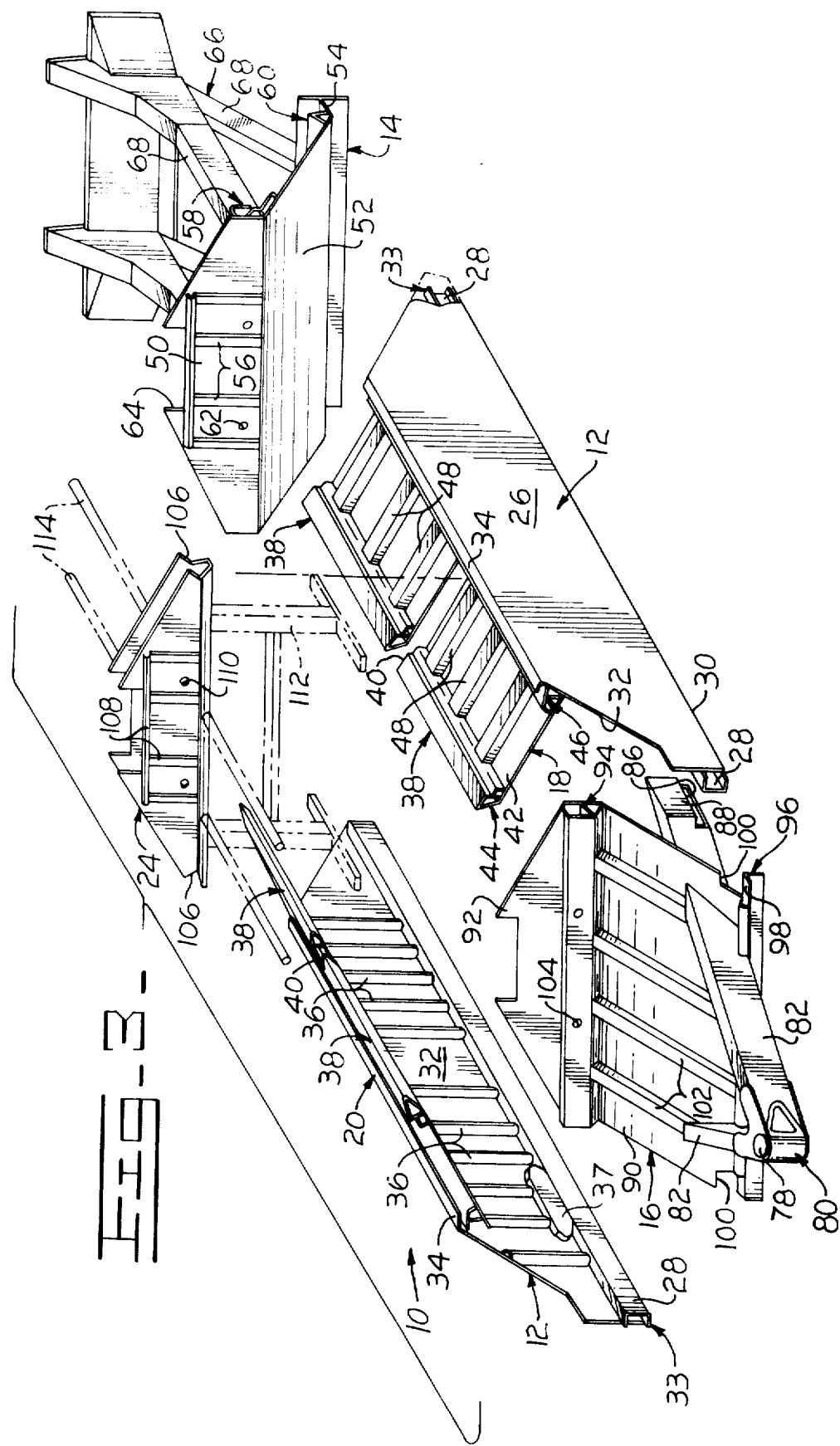

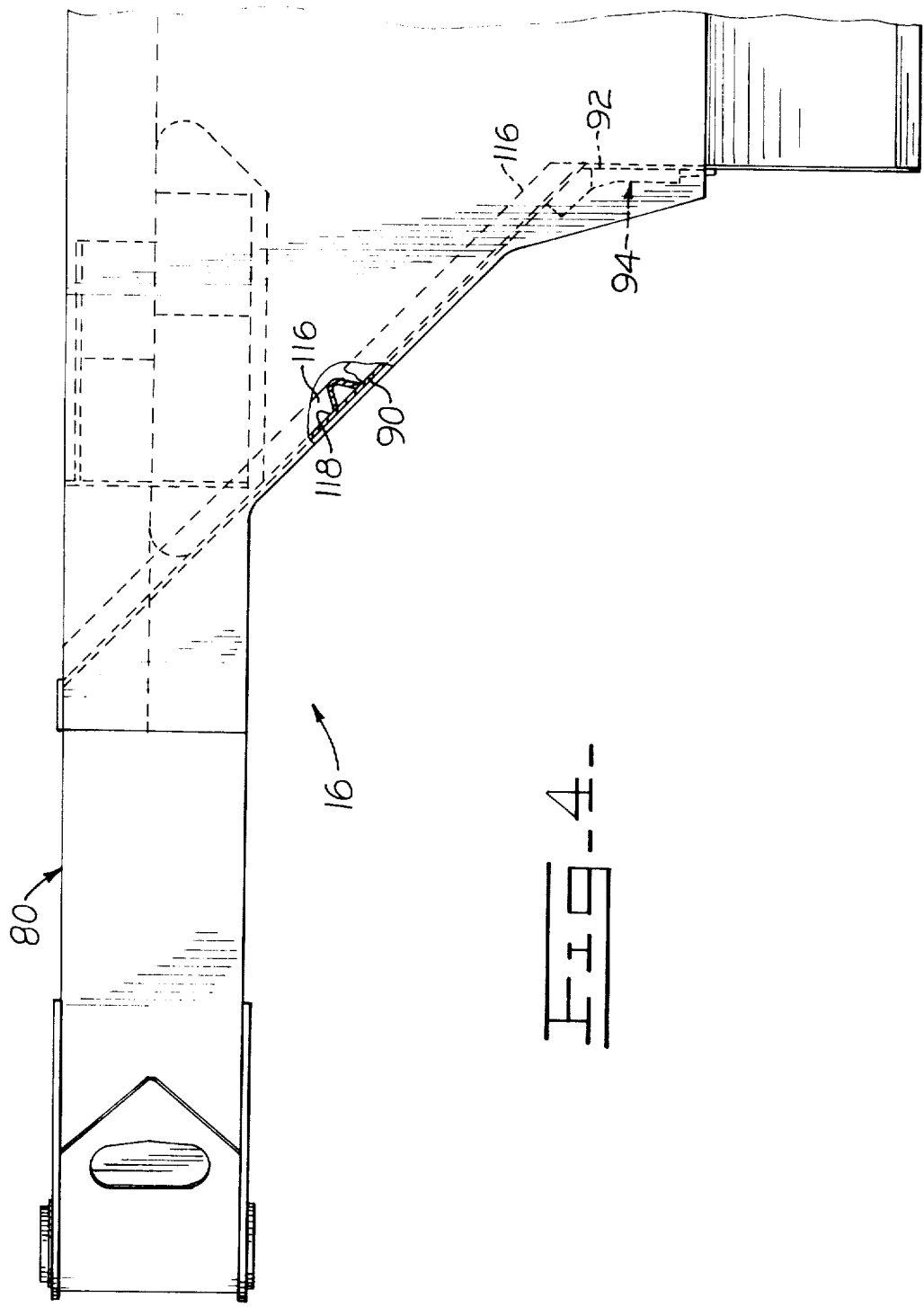

MODULAR DUMP TRAILER STRUCTURE

CROSS REFERENCE TO RELATED APPLICATION

This application is related to U.S. Pat. application Ser. No. 472,709, filed on May 23, 1974 by Samuel L. Kershaw and Bernard E. Proesche for Modular Truck Body and Method for Making Same.

BACKGROUND OF THE INVENTION

The ever increasing size of on and off-highway trucks has given rise to shipping problems; namely, various regulations which dictate the maximum size of a truck and components thereof which may be shipped on commercial carriers. Therefore, truck bodies and the like are normally broken-down into their component parts to comply with such regulations and to also substantially decrease composite shipping volumes and shipping costs. In conventional practice, the truck body is normally completed at a manufacturing facility by securing the various plates and beam members thereof together by standard welding processes.

The completed truck body is then cut into several sections at the various welds for shipping purposes. The re-assembly and fabrication of the component parts at a customer's job site requires complex fixtures and methods for applying high quality welds over the welded joints which have been severed previously. In addition to the laborious and time-consuming nature of such a procedure, the resulting welds are sometimes found defective to thus impair the structural integrity of the completed truck body.

Another characteristic of prior art hauling equipment, such as dump trailers, and the like, is the use of great bulks of fabricating materials for strength under loading. This rather undesirable feature often results from an inadequate load design which substitutes heavy structural members for light-weight properly stressed members. For example, most prior art hauling units, utilizing add-on support struts or ribs to strengthen the walls of such units, dispose such support members on the exterior of such walls. When the unit is loaded, the walls tend to bow outwardly under great tensile stress which must usually be countered through the use of heavier wall and support materials and structures such as relatively expensive box beams and the like.

Also, prior art hauling units often fail to properly integrate motivating structure, such as draft beams and the like, with the body structure so as to provide handling stability and unit strength.

Some prior art attempts to address these and related problems may be found in U.S. Pat. No. 2,494,472; 2,729,503; 2,760,816; 3,071,414; 3,254,920; and 3,558,190.

The primary object of this invention is to overcome the above, briefly described problems by providing an economical and non-complex modular truck body or other hauling unit which exhibits a high degree of structural integrity and a method for making the same expeditiously.

A more specific object of this invention is to provide an improved heavy duty dump trailer or wagon having single sheet plate walls with bracing or support ribs disposed on interior of such walls rather than the exterior thereof.

Another object of the present invention is to provide a dump wagon having modular wall assemblies which are structurally integrated with a V-shaped draft beam assemblage for such wagon.

A further object of the invention is to provide an improved dump wagon wherein the bracing or support ribs and other reinforcing members are formed by rolling single sheet plates into light-weight channel members instead of conventional box beams.

Other objects and advantages of the present invention will become apparent upon a reading of the description and claims.

SUMMARY OF THE INVENTION

A dump trailer comprises a pair of upstanding and laterally spaced side wall modules, a bottom module including dump doors having its outer ends secured to inner ends of the side wall modules and an upstanding front wall module secured between the side wall modules and having its lower end secured to the bottom module. Each wall module includes only a single thin plate member adapted to be loaded in tension with bracing members secured internally thereof.

BRIEF DESCRIPTION OF THE DRAWINGS

FIG. 1 is a side elevational view of a dump trailer vehicle employing the modular body of this invention;

FIG. 2 is a plan view of the vehicle shown in FIG. 1;

FIG. 3 is an exploded, inverted isometric view of the vehicle of FIG. 1 during assembly thereof; and FIG. 4 is an enlarged elevational view of the front wall portion of the vehicle showing a modified embodiment thereof.

DETAILED DESCRIPTION

With reference to FIGS. 1 through 3 of the drawings, a modular bottom dump trailer structure shown generally at 10 includes a pair of laterally spaced, substantially upstanding side wall modules 12, a rear end wall module 14, a front end wall module 16, and a pair of interrupted hopper floor members 18 and 20 oppositely outwardly and upwardly secured to the side wall modules to selectively define a central elongated opening 22 for egress of material carried within the trailer. Also, an inverted U-shaped housing 24 is spannably transversely secured between the side wall modules at the lower portion thereof.

The side wall modules 12 are essentially identical mirror images which include a generally trapezoidal-shaped single plate outer wall 26 with an outwardly facing, elongated C-shaped channel bracing member 28 secured adjacent to an upper edge 30 thereof and against an inner surface 32 of the wall to provide a strong structural upper rail assembly 33. The outer wall 26 includes at the lower edge thereof an inwardly extending, wall-strengthening and hydraulic-line-protecting, rolled-over lip 34. To provide additional strength in the side wall modules, a plurality of outwardly facing C-shaped rib members 36 are provided which extend downwardly from the channels 28 in substantially equal longitudinally spaced relation along the side wall modules. A draft beam seat reinforcing plate 37 is also secured to each inner wall surface 32 forwardly adjacent the upper rail assembly 33 for extra strength.

Each of the interrupted hopper floors 18 and 20 includes a pair of substantially similar hopper floor assemblies 38 serving to define a transversely oriented opening 40 between them. Each hopper floor assembly includes a single floor plate 42, a sheet-like elongated angled member 44 longitudinally disposed along the inner edge of the floor plate and a sheetlike elongated angled member 46 similarly disposed along the outer edge thereof. The latter member serves to brace the hopper floor assemblies as they are upwardly abuttingly secured to the inner side wall surface 32. Additional strength is provided by a plurality of upwardly facing C-shaped channel members 48 which are transversely spannably secured to both angled members 44 and 46, and to the floor plate by welding or other suitable means.

The structure of the rear end wall module 14 includes a generally triangularly shaped lower single plate end wall 50, and a generally inclined single plate end wall 52 secured thereto with a ledge 54 defined as the upper portion thereof. Providing additional strength are a plurality of vertically oriented, outwardly facing C-shaped rib members 56, and lower and upper transversely horizontally disposed sheet-like angle members 58 and 60 bracingly secured to the opposite side of the wall 52. The lower end wall 50 and the angle members 58 have a pair of door pivoting openings 62 longitudinally therethrough, and a downwardly facing notch or recess 64 is provided in the wall for greater vertical clearance over material that is dumped from the trailer structure.

A trailer support and bumper structure 66 is disposed rearwardly of the end walls 50 and 52. It includes a plurality of forwardly diverging reinforcing beams 68 which are abuttingly intergratably secured to the lower and upper angle members. A pair of tandem wheels 70 are mounted upon an axle housing 72 which is secured to the structure 66 rearwardly by a universal ball joint 74 and forwardly by a pair of laterally spaced, upright resilient suspension struts 76 mounted therebetween. Such suspension system is disclosed more specifically in United States patent application Ser. No. 416,851 to James E. Gee, et al, of common assignment herewith.

While the rear of the dump trailer 10 is supported by the tandem wheels 70, the front end is supported through a suitable hitch assembly 78 by a conventional wheel tractor (not shown). This hitch assembly is disposed at the apex of a V-shaped draft beam 80 forming a major structural portion of the front end wall module 16. The draft beam includes a pair of rearwardly diverging legs 82 having a relatively strong box beam-type of construction, with an upwardly facing ledge portion 86 and a reinforcing plate 88 disposed at the rearward outer side thereof. The legs extend divergingly rearwardly and transpierce an inclined single plate end wall 90 of the front end wall module. With additional reference to a modified embodiment of FIG. 4, a triangularly shaped lower end wall 92, substantially similar to the rear end wall 50, is secured to the lower portion of the inclined end wall and a plurality of transversely horizontally disposed angle members 94 are secured outwardly therebetween for additional rigidity. A similar plurality of sheet-like angle members 96 are secured to the inclined end wall forwardly thereof above the draft beams. These angle members provide a downwardly facing bearing surface 98 which is arranged adjacent a pair of outwardly facing recesses 100 in the sides of the end wall 90. A plurality of upwardly facing, C-shaped channel members 102 are bracingly and reinforcingly secured to the end wall 90 intermediate the angle members 94 and 96. Also, a pair of laterally spaced, longitudinally oriented door pivoting openings 104 are provided in the end wall 92 and angle members 94, in a manner similar to the openings 62 of the opposite end wall.

The inverted U-shaped housing 24, having a pair of opposite stepped outer edges 106 and a plurality of bracing channel members 108, is rigidly secured to the inside wall surfaces 32 to stiffen the trailer structure and to generally contain a door actuating and support mechanism (not shown) for operation of a pair of longitudinally extending doors 111 and 113 as shown in phantom in FIG. 2. The housing contains a pair of door pivoting openings 110 therethrough which are generally disposed in longitudinally aligned relation with the door pivoting openings 62 and 104, respectively. U.S. Pat. No. 3,076,680 to R. H. Kress discloses a door actuating mechanism of the type that could be incorporated in the trailer structure 10.

DESCRIPTION OF ALTERNATE EMBODIMENT

In FIG. 4, an alternate front end wall module 16 is shown. It has a V-shaped draft beam 80, an inclined end wall 90 and angled members 94 substantially the same as those previously described. However, the alternate design includes a plurality of downwardly facing, C-shaped channel members 116 which are bracingly secured in laterally spaced longitudinal alignment on an inner surface 118 of the end wall. Rather than being disposed outwardly of the end wall as with the preferred embodiment, such inner surface placement of the channel members enables the end wall 90 to be utilized to a greater degree as a tension member during full-load traveling of the trailer structure 10. Under such operating condition the walls tend to be bowed outwardly in a convex manner, and the single sheet end wall 90 is better able to withstand the resultant tensile loading.

This same principle is used in the placement of the C-shaped rib members 36 on the inner surface 32 of the side wall modules 12, as shown best in FIG. 3. Such rib placement is in marked contrast to prior art hauling units which incorporate bracing beams on the outer surfaces of the side and end walls which results in the exposure of such ribs to the greatest tensile loading applied with consequent weld cracking initiated at the outermost fibers thereof.

METHOD OF ASSEMBLY AND OPERATION

The modular bottom dump trailer structure 10 of the present invention is assembled at a manufacturing facility in a substantially inverted condition shown in FIG. 3. The prefabricated side wall modules 12, including the integrally associated hopper floor assemblies 38 weldably secured thereto, are positioned substantially as shown between the end wall modules 14 and 16. In such disposition, the forward portions of the C-shaped channels 28 is inserted through the recesses 100 in the front wall module and seated upon the bearing surface 98 thereof. Thereupon, the smooth outer side wall 26 overlaps the end wall 90 and the angled members 94 and 96, and is weldably secured thereto. With such overlapping abutting and interlocking relationship, the tapered end portions of the legs 82, and particularly the reinforcing plate 88, are disposed against the draft beam seat reinforcing plate 37 adjacent the inner side wall surface 32. In this manner the upwardly facing ledge 86 of each leg is pilotably supportingly disposed against the under legs of the C-shaped channels 28.

Similarly, at the opposite end of the trailer structure 10, the under legs or lower portion of the C-shaped channel members 28 are seated against the upper ledge 54 of the rear end wall module 14. The inner side wall surfaces 32 of the side wall modules 12 are overlappingly disposed against the angle members 54 and 58 at substantially the same time the hopper floor assemblies 38 are endwardly secured to the longitudinally opposite lower end walls 50 and 92.

Substantially simultaneously therewith, the inverted U-shaped housing 24, which is suitably supported upwardly from the floor of the manufacturing facility by means of a suitable stand 112 shown in phantom in FIG. 3, is disposed within the openings 40 between the hopper floor assemblies 38 in such a manner that the stepped outer edges 106 are overlapping and abuttingly secured to the transversely opposite angled members 46 adjacent to the side wall surfaces 32. Preferably, a plurality of door pivot aligning rods 114, also shown in phantom, are placed within the door pivot openings 62, 104 and 110 prior to securing the various members rigidly together.

While the invention has been described with particular reference to the preferred embodiments, it is apparent that variations and modifications are possible within the purview of the inventive concepts. No limitations with respect to such variations and modifications is intended, except by the scope of the appended claims.

We claim:

1. A material hauling unit with a modular prefabricated structure comprising; first and second modular side wall assemblies, a modular front wall assembly, a modular rear wall assembly, and a modular bottom floor assembly, each said side wall assembly including at least one longitudinally extending structural support member attached to an upper edge portion of said side wall assembly, said front wall assembly including at least one laterally extending structural support member attached to said front wall assembly at an upper edge portion thereof, said laterally extending support member having a first bearing surface thereupon, said front wall assembly further including recess means including first and second oppositely disposed recesses on opposite sides of said front wall assembly for receiving said longitudinally extending support members upon engagement of said first bearing surface and said longitudinally extending support members upon assemblage of said front wall assembly with said first and second side wall assemblies.

2. The invention of claim 1 wherein said unit further includes draft beam means for connection of motivating means to said unit, said draft beam means including at least one heavy beam member transpiercingly disposed through and connected to said front wall assembly for rigid connection to one of said first and second side wall assemblies, said beam member having ledge means for engaging said longitudinally extending structural support member upon assemblage of said front wall assembly with said one of said first and second side wall assemblies.

3. The invention of claim 2 wherein said draft beam means include a pair of said heavy beam members, connected together at an apex to form a V-shaped structure, each heavy beam member being connected to one of said first and second side wall assemblies upon assemblage of said assemblies with said front wall assembly.

4. The invention of claim 2 wherein said at least one of said first and second side wall assemblies include draft beam seat reinforcing means for connection of one end of said heavy beam member to said at least one side wall assembly.

5. The invention of claim 1 wherein said modular bottom floor assembly includes bottom opening dump door means for selective egress of materials from said hauling unit, said hauling unit further comprising U-shaped housing means for pivotably supporting said dump door means and for housing actuation means for said dump door means, said U-shaped housing means including a plurality of stepped outer edge portions for supporting engaging said at least one longitudinally extending structural support member to give structural support to said first and second modular side wall assemblies.

6. The invention of claim 5 wherein said dump door means include a pair of longitudinally extending door members each pivotably mounted between said modular front and rear wall assemblies by pivot means.

7. The invention of claim 6 wherein said U-shaped housing means, said front wall assembly, and said rear wall assembly are each provided with a pair of aperture means for receiving said pivot means.

8. The invention of claim 1 wherein first and second modular side wall assemblies each include a single thickness plate of sheet material extending longitudinally between said front wall assembly and said rear wall assembly upon assemblage of the hauling unit.

9. The invention of claim 1 wherein said modular front wall assembly includes single thickness sheet material front plate means, said first and second recesses being disposed in said front plate means, said front wall assembly further including a plurality of C-shaped sheet material channel members for strengthening said front plate means and attached thereto.

10. The invention of claim 9 wherein said plurality of C-shaped sheet material channel members are attached to said front plate means on the exterior surface thereof opposite to said interior-hauling material engaging surface thereof.

11. A material hauling unit with a modular prefabricated structure comprising; first and second modular side wall assemblies, a modular front wall assembly, a modular rear wall assembly, and a modular bottom floor assembly, each said side wall assembly including at least one longitudinally extending structural support member attached to an upper edge portion of said side wall assembly, said front wall assembly including at least one laterally extending structural support member attached to said front wall assembly at an upper edge portion thereof, said laterally extending support member having a first bearing surface thereupon, said front wall assembly further including recess means for receiving said longitudinally extending support members upon engagement of said first bearing surface and said longitudinally extending support members upon assemblage of said front wall assembly with said first and second side wall assemblies, said modular rear wall assembly including at least one laterally extending rear support member connected at an upper edge portion of said rear wall assembly, said rear support member having flat ledge bearing means thereon for supportingly and abuttingly engaging said longitudinally extending upper support member of said side wall assembly upon assemblage of said side wall assemblies with said rear wall assembly.

12. A material hauling unit with a modular prefabricated structure comprising; first and second modular side wall assemblies, a modular front wall assembly, a modular rear wall assembly, and a modular bottom floor assembly, each said side wall assembly including at least one longitudinally extending structural support member attached to an upper edge portion of said side wall assembly, said front wall assembly including at least one laterally extending structural support member attached to said front wall assembly at an upper edge portion thereof, said laterally extending support member having a first bearing surface thereupon, said front wall assembly further including recess means for receiving said longitudinally extending support members upon engagement of saiid first bearing surface and said longitudinally extending support members upon assemblage of said front wall assembly with said first and second side wall assemblies, said first and second modular side wall assemblies each include a single thickness plate of sheet material extending longitudinally between said front wall assembly and said rear wall assembly upon assemblage of the hauling unit, said single thickness plates being provided with rib means for strengthening said single thickness plate, said rib means being attached to said single thickness plates on the interior-hauling material engaging sides thereof.

13. The invention of claim 12 wherein said rib means comprise a plurality of upstanding rib members rollably fabricated from single pieces of sheet material, said rib members being C-shaped in section.

14. A material hauling unit with a modular prefabricated structure comprising; first and second modular side wall assemblies, a modular front wall assembly, a modular rear wall assembly, and a modular bottom floor assembly, each said side wall assembly including at least one longitudinally extending structural support member attached to an upper edge portion of said side wall assembly, said front wall assembly including at least one laterally extending structural support member attached to said front wall assembly at an upper edge portion thereof, said laterally extending support member having a first bearing surface thereupon, said front wall assembly further including recess means for receiving said longitudinally extending support members upon engagement of said first bearing surface and said longitudinally extending support members upon assemblage of said front wall assembly with said first and second side wall assemblies, said modular front wall assembly including single thickness sheet material front plate means, said front wall assembly further including a plurality of C-shaped sheet material channel members for strengthening said front plate means and attached thereto, said plurality of C-shaped sheet material channel members being attached to said front plate on the interior-hauling material engaging surface thereof.

15. A material hauling unit with a modular prefabricated structure comprising; first and second modular side wall assemblies, a modular front wall assembly, a modular rear wall assembly, and a modular bottom floor assembly, each said side wall assembly including at least one longitudinally extending structural support member attached to an upper edge portion of said side wall assembly, said front wall assembly including at least one laterally extending structural support member attached to said front wall assembly at an upper edge portion thereof, said laterally extending support member having a first bearing surface thereupon, said front wall assembly further including recess means for receiving said longitudinally extending support members upon engagement of said first bearing surface and said longitudinally extending support members upon assemblage of said front wall assembly with said first and second side wall assemblies, said modular front wall assembly including single thickness sheet material front plate means, said front wall assembly further including a plurality of C-shaped sheet material channel members for strengthening said front plate means and attached thereto, said front plate means including a first laterally extending material clearance recess, said hauling unit further comprising U-shaped housing means for lending structural support to said first and second modular side wall assemblies and to said modular bottom floor assembly, said U-shaped housing means including a second laterally extending material clearance recess, said modular rear wall assembly including a third laterally extending material clearance recess, said first, second and third clearance recesses being in substantial alignment upon assemblage of said hauling unit.

16. The invention of claim 15 wherein said modular rear wall assembly includes single-thickness sheet material rear plate means, and further includes a plurality of upstanding C-shaped sheet material rib members for strengthening said rear plate means, said plurality of rib members being attached to said rear plate means on both the interior-hauling material engaging surface thereof and on the exterior surface thereof.

* * * * *